Jan. 5, 1954

K. SPITZ 2,664,622

METHOD OF EFFECTING NONFUSION
WELDS WITH A STEEL WELDROD

Filed March 2, 1950

INVENTOR.
KARL SPITZ
BY
William Isler
ATTORNEY.

Patented Jan. 5, 1954

2,664,622

UNITED STATES PATENT OFFICE 2,664,622

METHOD OF EFFECTING NONFUSION WELDS WITH A STEEL WELDROD

Karl Spitz, Cleveland, Ohio

Application March 2, 1950, Serial No. 147,247

15 Claims. (Cl. 29—366)

1

This invention relates to the non-fusion welding of similar or dissimilar metals by means of a steel filler metal or weldrod, and more particularly to the bonding of a steel filler metal to a ferrous or non-ferrous base metal. As will hereinafter more fully appear, my novel method combines certain features and characteristics of both fusion welding and brazing and therefore I find it convenient to refer to it as "weldbrazing" so as to distinguish it from conventional fusion welding and brazing processes.

This application is a continuation-in-part of my copending application, Serial No. 5,903, filed February 2, 1948, now abandoned, relating to Methods and Materials for the Joining of Metallic Articles, which was a continuation of my application Serial No. 487,842, filed May 19, 1943, for "Welding Process," now abandoned.

The prior art

The best known and most widely used method of integrating ferrous metals is fusion welding in which both the parent or base metal and the filler or weld metal are melted or fused at the joint in the weldzone. The liquid phase of the base metal and the liquid phase of the weldmetal intermingle or flow together at the weldzone and, upon cooling and solidification, a bond is achieved. Inasmuch as the bonding temperature, i. e., the temperature at which union of the metals occurs, is the melting or liquids temperature of the base metal, or even higher, the base metal, in the case of steel, passes through the critical temperature and phase transformations occur resulting in the formation of austenite. Upon relatively rapid cooling, such as occurs in the air cooling of welded areas, a further transformation occurs in which the austenite decomposes partially into hard and brittle martensite. Theoretically, controlled heat-treatment of the welded part could be used to restore the original structure of the steel, however, in most instances such a procedure would be uneconomical as well as impracticable.

Thus, fusion welding requires a large heat input to raise the temperature of the base melt to its melting point, and further, the high working temperature range of about 1450° C. to 1535° C. results in harmful deterioration of the structure in the weldzone and in the adjacent heat-affected areas. Among the harmful effects are such well-known phenomena as:

2

Graphitization of steam lines in low carbon steel,
Brittle, martensitic structure in high carbon steel,
Permanently spoiled structure in high manganese steels, Impaired corrosion resistance in stainless steels.

In order to overcome the disadvantages of fusion welding which result from the high bonding temperatures necessarily employed, brazing is often used. In brazing, the base metal is required to be heated only to the melting temperature of the non-ferrous lower-melting filler metals, such as brass, bronze, copper, and nickel-silver, which are used and therefore the bonding temperature range can be maintained between 850°–1080° C. thereby avoiding or minimizing the high temperature disadvantages of fusion welding.

Brazing is however also subject to certain limitations and disadvantages which result from the utilization of the low-melting non-ferrous filler metals. Among these may be listed:

Low tensile strength of the filler metal.
Basic differences in characteristics and appearance of the filler metal as compared to steel.
Inability of the joint to withstand elevated temperatures.
Burning or failure to bond if overheated during the brazing process.

A third, but less commonly used method of joining metals is pressure welding in which no filler metal is employed, but the parts to be joined are subjected to heat and high pressure and bonding takes place between the solid phases of the metals by means of diffusion, intergranular penetration, cohesion, etc.

Pressure welding requires special equipment, accurate control and has at present only a limited field of application.

In summary, the prior art discloses liquid to liquid phase joinder (fusion welding), liquid filler metal to solid phase base metal joinder (brazing), and solid to solid phase joinder (pressure welding). There also exists a specialized form of non-fusion welding of cast-iron by means of cast-iron filler metal and also a form of fusion welding of steel in which oxidation at high temperature of the weldzone is minimized by deposition of the molten stainless steel filler metal on the solid base steel with subsequent heating to fusion.

The objects of the invention

It is the primary object of my invention to provide a procedure or method for joining metals, particularly steels, in which a steel weldmetal is employed at bonding temperatures which are well below those employed in fusion welding thus obtaining a joint of comparable strength and characteristics as that obtained in fusion welding while at the same time avoiding the undesirable and harmful high temperature effects on the base metal which are incidents of fusion welding.

Another object of my invention is to provide a non-fusion metal joining process in which the base metal is at all times maintained at a temperature below its solidus.

Still another object of my invention is to provide a process, as described, in which, as contrasted to brazing, the base metal need not be heated to the liquidus temperature of the filler metal in order to effect a bond.

A further object of my invention is to provide a non-fusion welding process for metals which will permit the joinder of non-ferrous metals by means of steel filler metals.

Another object of my invention is to provide a method of non-fusion welding which is applicable to certain types of steels which are not amenable to fusion welding.

Still another object of my invention is to provide a method, as described, wherein less heat-input is necessary to effect bond thereby effecting economies in operation.

Other objects and advantages of the invention will be apparent during the course of the following description.

In the accompanying drawings, forming a part of this specification, and in which like numerals are employed to designate like parts throughout the same, Fig. 1 is a graphic comparison of fusion welding and weldbrazing as applied to steel, illustrating diagrammatically by means of various curves the mechanism and advantages of the weldbrazing process.

Weldbrazing

Figure 1:
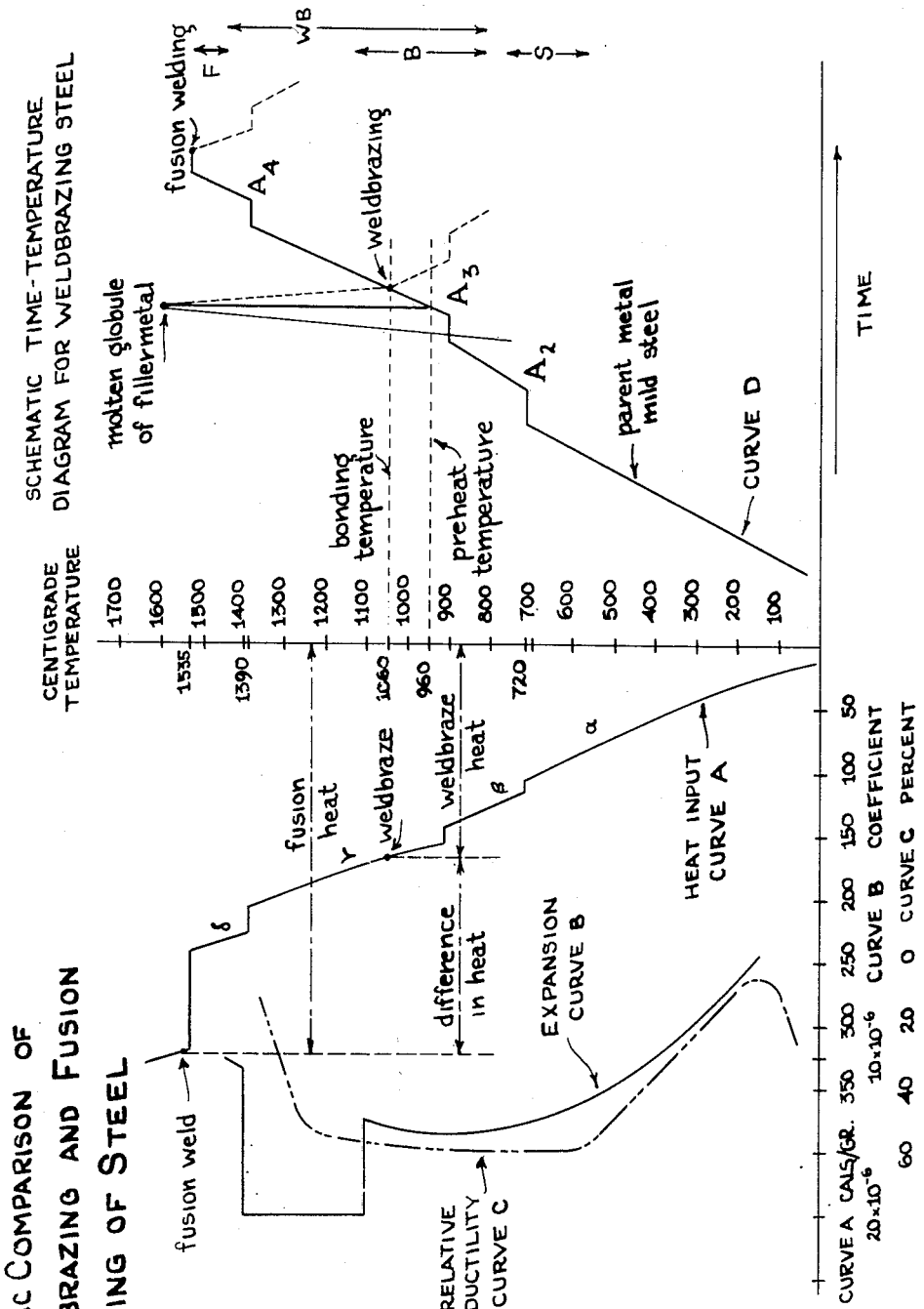

The process of weldbrazing is based upon my discovery that an affinity can be established between a molten steel filler metal and a solid phase base metal which will result in an excellent bond between the metals upon solidification of the filler metal.

The nature of the bond results from the forces of diffusion, cohesion, adhesion and intergranular penetration and is comparable, in a sense, to the bond obtained in pressure welding.

In practicing my method of non-fusion welding, I use a steel or alloy steel weldrod such as would customarily be used in the fusion welding of ferrous base metals.

In the welding of structural steels, the weldrod usually conforms fairly closely to the basic characteristics of the base metal to be welded. In other applications of welding, such as hardfacing or corrosion facing, for example, the steel weld rod selected may have characteristics which are different from that of the base metal. Such steel weld rods may contain varying amounts of carbon, however, by definition, a steel weldrod would not contain in excess of 1.7% carbon.

The base metal is prepared in the usual manner, that is, it should be clean and free from undesirable particles or coatings and the edges to be joined may be machined or ground where necessary to such form as will encourage penetration of the weldlayer.

The base metal is then preheated to the bonding temperature range which is an elevated temperature below the solidus of the base metal. This bonding temperature will, of course, vary with the particular composition of the base metal. The range of the bonding temperature will also be much greater for high-melting base metals than for low-melting base metals. In general, satisfactory bonding characteristics can be obtained at temperatures about 150°–200° C. below the solidus of the base metal and in some instances at even much lower temperatures. I have found that a temperature which is from 10% to 40% less than the solidus temperature of the base metal is satisfactory for bonding. The following list is illustrative of the bonding temperatures of various base metals when using my non-fusion welding process:

| | Degrees C. |
|---|---|
| Low carbon steel | 1,100 |
| High carbon steel | 950 |
| Stainless steel | 870 |
| Manganese steel | 1,150 |
| Copper | 900 |
| Brass | 800 |
| Nickel-silver | 850 |
| Nickel alloys | 1,100 |

When the base metal has been preheated to the bonding temperature range, the weldrod is melted and deposited or fed into the weldzone while maintaining the base metal at or near said bonding temperature. Simultaneously, there is introduced into the weldzone a combination of elements which will have the effect of forming lower melting phases in the weldrod composition and will also increase the fluidity and reduce the surface tension of the molten weldrod.

This combination of elements may be introduced separately as in powder or paste or rod form or it may be introduced as a core in the weldrod, or as a coating on the weldrod.

The introduction of this combination of elements performs two vital functions which to some extent are overlapping.

The lower-melting phases of the weldlayer are obtained by the introduction of elements selected from the group consisting of manganese, copper, chromium, nickel, molybdenum, boron, silicon and phosphorus. These elements form eutectiferous phases in the weldlayer which have affinity for both the steel weldrod and the base metal. Thus, the eutectiferous phases which are formed by the introduction of these elements into the weldzone form an initial bond with the base metal which induces the bonding of the weldlayer to the base metal. These elements also have the desirable effect of enhancing the fluidity of the molten weldlayer.

The increase in fluidity of the weldmetal and the reduction of the surface tension of the molten globule is primarily brought about by the introduction of silicon or phosphorus and silicon, although titanium, zirconium, columbium, calcium, lithium or tantalum may be introduced to assist in obtaining good flowing properties. These elements have the effect of inducing a wetting action of the molten globule on the base metal which evidences itself in the rapid spreading and flow of a deposited globule of weldmetal at the bonding temperature.

The quantity of the introduced elements will depend to some extent upon the composition of the base metal, the composition of the weldrod, and the characteristics desired in the weldlayer. However, I have found that if no predetermined physical or chemical characteristics of the weldlayer are established, satisfactory bond can be accomplished by introducing a sufficient quantity of the eutectiferous phase-forming elements so that they comprise about 10% by weight of the composition of the weldlayer. It will be understood that the same elements which form the eutectiferous phases are ordinarily utilized to impart certain physical or metallurgical properties to alloys, such as high tensile strength, hardness, corrosion resistance, etc. Therefore, it will be understandable that said eutectiferous phase-forming elements may well be present in the weldlayer in excess of the 10% mentioned, for the purpose of obtaining certain predetermined physical and chemical characteristics.

The surface tension reducing elements are introduced in an amount sufficient to effect the flowing and spreading action heretofore referred to, depending upon the composition of the weldrod, base metal, and the quantity of eutectiferous elements present. The surface-tension elements may comprise from about 0.10 to 10% of the composition of this weldlayer. In addition, fluxing and cleansing agents may be used on the base metal as is well understood.

As the advantages of my invention flow primarily from the fact that the temperature of the base metal is maintained below its solidus, it is important in practising weldbrazing that the heating unit employed, when it is a gas torch or an arc electrode, be moved sufficiently rapidly over the weldzone to prevent overheating of the base metal by concentration of the heat on a particular area for too long a time. As a consequence thereof, it is usually impracticable to deposit a single heavy layer of weldmetal by use of the weldbrazing process. Instead, it is preferable to build up the thickness of the weldlayer with multiple layers in those instances where a heavy deposit of weldmetal is required.

In practising weldbrazing with a torch, for example, the following technique may be employed to prevent overheating of the base metal. When pre-heating, the torch is kept waving or circling and the flame is directed so as to impinge upon the weldzone in order to get an even distribution of heat. When the preheat temperature is reached, the flame of neutral composition is moved slightly away from the surface of the base metal and directed more or less tangentially against the surface in order not to melt the base metal and yet maintain it at the requisite temperature. The weldrod, having associated therewith the combination of elements heretofore referred to, is kept in a position perpendicular to the flame but not traversing it, so that it does not cut the flame during pre-heating. When the preheating is completed, the tip of the weldrod is melted. The flame is now directed closer to and more directly against the surface of the base metal and the molten weldrod is deposited or fed into the weldzone and drawn forward slightly in the direction of the joint by a coincident movement of the rod and the flame. Then the flame is withdrawn slightly from the surface of the base metal and directed against it at a very acute angle, almost tangential to the deposited molten globule, until the globule has spread and bonded with the base metal. Thereby the kinetic energy of the flame encourages the flow and spread of the globule and by a suction effect draws gas inclusions and impurities to the surface of the melt and insures non-porosity of the layer.

In arc welding, overheating may be avoided by maintaining a high melting rate and continuous waving movement of the electrode. It may also be avoided by depositing an insulating layer of granular flux or of the combination of elements in the weldzone before heating. A flux, which contains considerable amounts of alloying constituents corresponding to the desired composition of the layer, is used and applied as a heavy coating to the surface of the joint and to the electrodes. As soon as the arc is struck between the electrode and the metallic constituents of the flux, the flux is melted and forms an intermediate zone of diffusion and intergranular penetration with the parent metal, which thus is heated indirectly only, but not melted.

The weldbrazing technique can also be adapted to other forms of electrical welding, such as resistance and induction heating. It may also be adapted to conditions where the weldrod or weldrod composition is melted in a crucible, for example, and poured onto the surface of the base metal.

Figure 2:
Fig. 2 is a photograph of a weldlayer of stainless steel 18:8 as fusion welded to a .75% carbon steel plate.
Figure 3:
Figs. 3 and 4 are photographs showing the appearance of a weldbrazed layer on the same high carbon steel plate.
Figure 4:

The photograph in Fig. 2 of the drawings illustrates the appearance of the weldlayer on a fusion welded plate of 0.75 C steel. Figs. 3 and 4 illustrate the appearance of the weldlayer on a .75 C steel plate as performed in accordance with my weldbrazing method. It will be noted that Figs. 3 and 4 illustrate a marked improvement in the smoothness and non-porosity of the weldlayer as contrasted to Fig. 2.

Figure 5:
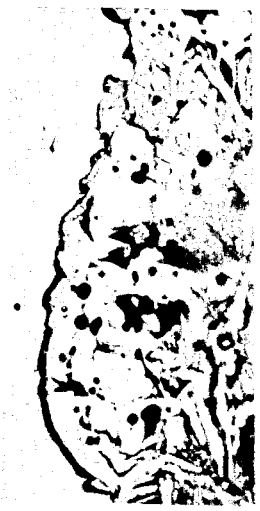
Figs. 5 and 6 are photomicrographs of cross-sections of weldbrazed layers on a .75% carbon steel plate, etched with picric acid, showing the appearance of the bond at the interface thereof.
Figure 6:

As a consequence of the lower bonding temperature used in the weldbrazing process, the weldzones have a normalized structure as will be evident from an inspection of the photomicrographs shown in Figs. 5 and 6, whereas in fusion welding a brittle, martensitic structure results. Therefore, the weldbrazed high carbon steel is readily machinable, whereas the same steel when fusion welded is non-machinable.

I have successfully performed the weldbrazing of carbon steels by depositing a weldlayer having, for example, the following composition:

| | Percent |
|---|---|
| Carbon | 0.11 |
| Silicon | 2.98 |
| Phosphorus | 1.49 |
| Manganese | 0.31 |
| Copper | 13.10 |
| Nickel | 13.10 |
| Iron | Remainder |

Figs. 5 and 6 of the drawings illustrate the type of bond achieved in the weldbrazing of 0.75 carbon steel.

It is to be noted that the zone of bonding is relatively narrow, on the order of one-thousandth of an inch as contrasted to the fused zone in fusion welding which is up to 90 times greater.

All metals which are weldable by fusion welding at temperatures above 800° C. are amenable to non-fusion welding with steel or alloy steel filler metal through use of the weldbrazing process. Many metals which are joined by brazing can likewise be weldbrazed using steel filler metal.

The relatively low bonding temperatures which are utilized in the weldbrazing process even makes possible the satisfactory welding of metals which have heretofore been considered to be difficult or impossible to weld successfully by fusion welding.

For example, the difficulty in fusion welding stainless steel 18:8 lies in the fact that when the steel is heated to about 875° C. it becomes susceptible to "weld decay." At that temperature, the carbon which until then was in solution, has a higher affinity for chromium than for the ferrous matrix which becomes depleted of chromium. Consequently, no contiguous chrome-oxide film is formed on the surface of the weldzone of the stainless steel to protect the underlying metal from corrodents. Thus, stainless steel 18:8 loses its corrosion-resistant properties when heated above about 875° C., which is necessarily the case in fusion welding at working temperatures of about 1450° C.

By using the weldbrazing method to weld stainless steel, bond is achieved at about said critical temperature and thus weld decay is avoided and the corrosion resistance of the steel is not impaired.

I have successfully performed the weldbrazing of 18:8 stainless steels by depositing a weldlayer having, for example, the following composition:

| | Percent |
|---|---|
| Carbon | 0.11 |
| Silicon | 0.25 |
| Phosphorus | 0.02 |
| Manganese | 0.12 |
| Copper | 7.70 |
| Nickel | 18.20 |
| Chromium | 12.60 |
| Molybdenum | 10.80 |
| Iron | Remainder |

The weldbrazing process also permits the successful welding of manganese steels. Manganese steel has strength and toughness only when heated between 1040°–1200° C., followed by quenching in water. However, its structure is permanently spoiled by heating it above 1200° C. and cannot be restored by any treatment. Thus fusion welding of manganese steel results in a permanently spoiled structure. In contrast thereto, weldbrazing of manganese steel can be performed at a bonding temperature of 1150° C. which is well within the tolerable range of heat-treatment and the steel can then be quenched in oil or water to restore its strength and toughness.

I have successfully performed the weldbrazing of manganese steels by depositing a weldlayer having, for example, the following composition:

| | Per cent |
|---|---|
| Carbon | 0.877 |
| Silicon | 5.50 |
| Phosphorus | 2.75 |
| Manganese | 4.80 |
| Iron | Remainder |

In most cases, the fusion welding of non-ferrous metals and alloys, which utilizes filler metals of similar composition, does not result in such vital deterioration of the structure of the base metal in the weldzone as is the case in the fusion welding of steels. There do exist, however, some minor disadvantages, such as, oxidation of the molten metals which causes nickel or copper to become brittle and brass to become porous due to hydrogen pick up.

However, as an exception to the foregoing the "Hastelloy" nickel base alloys which contain up to 65% Ni and 30% Mo, behave similarly to steel when heated above its critical temperature range. The high working temperature used in fusion welding "Hastelloy" causes precipitation in the heat affected zones which consequently become less corrosion resistant and more susceptible to cracking.

In utilizing weldbrazing for the joining of "Hastelloys," the nonferrous base metal is preheated to about 1000° C. and then the molten weldmetal is deposited. The temperature of the base metal then rises to about 1100° C. at which temperature the bond occurs. Immediately thereafter, the welded part is quenched in water and thereby the physical and corrosion-resistant properties of the "Hastelloy" are retained.

I have successfully performed the weldbrazing of "Hastelloys" by depositing a weldlayer having, for example, the following composition:

| | Per cent |
|---|---|
| Carbon | 0.111 |
| Silicon | 2.91 |
| Phosphorus | 1.45 |
| Manganese | 0.30 |
| Copper | 12.80 |
| Nickel | 12.80 |
| Molybdenum | 5.50 |
| Iron | Remainder |

The weldbrazing process is distinguishable from ordinary fusion welding primarily in the fact that the bonding temperature range is below the solidus of the base metal. Weldbrazing is distinguishable from brazing in two respects, namely, that the filler metal is steel or alloy steel and that the bonding temperature range is well below the liquidus of the filler metal. In brazing, the base metal, though not heated above its solidus, is necessarily heated to or above the liquidus of the low-wetting brazing alloys, whereas in weldbrazing the base metal may be copper, for example, which has a lower liquidus temperature than the steel filler metal.

It is to be noted that in weldbrazing there is a substantial temperature gradient between the deposited molten weldlayer and the base metal. This usually will result in some heat transfer between the molten globule of weldmetal and the base metal which will tend to increase the temperature of the base metal in the area of the weldzone by 50° C. to 100° C. above the preheat temperature. This elevated temperature is considered to be within the bonding temperature range, however, if desired, it may be compensated for by preheating the base metal to a temperature which is 50°–100° C. less than the particular bonding temperature which is to be attained.

In the schematic time-temperature diagram in Fig. 1 of the drawings, I have attempted to indicate the mechanism of my process as applied to a mild steel base metal. Curve D shows the transformation phases of the steel as it is heated to elevated temperatures. Fusion welding takes place at temperatures of 1535° C. and higher whereas the bonding temperature of weldbrazing in this particular example is at 1060° C., only slightly and temporarily above the critical temperature of the steel and well below its solidus temperature. This weldbrazing bonding temperature is within the illustrated weldbraze range.

The base metal is preheated to 960° C., and, as indicated diagrammatically, the molten globule of filler metal is deposited in the weldzone at the time this preheat temperature is attained. There is a transfer of heat between the molten filler metal and the base metal which causes the temperature of the base metal to increase to the bonding temperature, while simultaneously the globule of filler metal cools to said bonding temperature and bond is completed.

The temperature ranges indicated by the arrows to the right of curve D indicate the working temperature ranges of various methods of joining steels and indicate the position occupied by my novel method as well as the broad range which it covers.

Range F is the temperature range of fusion welding of iron, steel, and stainless steels and embraces 1450° to 1535° C., a total range of 85° C.

Range B covers the brazing of said steels with copper, nickel-silver, and brass and runs from about 820° C. to 1140° C., a range of 320° C.

Range S covers silver-soldering of steels between 570° C. and 770° C., a range of 200° C.

Range WB, the weldbrazing temperature range runs from 820° C. to 1450° C., a range of 630° C. which is greater than the working range of any of the foregoing methods.

It will be understood that the eutectiferous-phase-forming and surface tension reducing elements are introduced into the weldzone substantially simultaneously with the deposit of the molten weldrod. As heretofore stated this may be done in various ways, such as cores, coatings, or separate powders, pastes or rods, or the combined elements may be associated with the weldrod in the initial melt from which the weldrod is formed.

When separate fluxes are used, they are composed to perform the following functions: First, to react at low temperature, during pre-heating, with the surface of the base metal to cleanse it of non-metallic dirt and grease, and to effect distribution of the alloying constituents. Second, to react near the bonding temperature, with the surface of the base metal to effect cleansing of metallic surfaces and bridging of constituents, such as cementite and other chemical compounds which impair the flowing of the filler alloys, and thus increase the metallic surface by the introduction of metals and alloys in powder form. These metallic powder isles absorb more heat than the base metal. Consequently, pre-alloying or diffusion of these constituents into the solid base metal takes place and an intermediate zone and bond is formed in advance of the actual process welding during the comparatively long pre-heating period. Shortly thereafter, the molten steel filler alloy is applied onto the intermediate zone during the actual process of bonding, and forms a perfect bond by cohesion, diffusion and intergranular penetration.

Advantages

My process of non-fusion welding results in a strong bond having excellent physical properties. The weldbrazing process can be employed for the joinder of ferrous and non-ferrous metals. It can be utilized for carbon steels, tool steels, manganese steels, corrosion-resistant and heat-resistant alloys, etc.

Inasmuch as the bonding temperatures employed in weldbrazing are substantially lower than those required in fusion welding, consider-able economies can be effected as a result of the reduced heat input required.

Curve A of Fig. 1 illustrates graphically the comparative total heat input required for fusion welding and weldbrazing. It is to be noted that apart from the difference in heat energy required to raise the base metal from the weldbrazing bonding temperature (1060° C.) to the ion welding temperature (1535—° C.) there is also a substantial heat input required to fuse the metal at 1535° C. which corresponds to the latent heat of fusion of the steel. As indicated in Table I below, the use of weldbrazing over fusion welding results in substantial economies in heat energy required.

Table I

| Temp., ° C. | Heat input, cals./gm. | Savings in heat input | Percentage of heat input saved by weldbrazing |
|---|---|---|---|
| Fusion welding: 1,535 | 320 | | |
| Weldbrazing: | | | |
| 1,400 | 210 | 110 | 34.0 |
| 1,300 | 190 | 130 | 40.5 |
| 1,200 | 180 | 140 | 43.5 |
| 1,100 | 170 | 150 | 46.7 |
| 1,000 | 160 | 160 | 50.0 |
| 900 | 140 | 180 | 56.0 |
| 800 | 130 | 190 | 59.0 |

Curve B shows that above about 1100° C. the coefficient of expansion of steel increases abruptly. Curve C shows that above about 1200° C. the ductility of high carbon steel decreases rapidly. The preferred weldbrazing range of 850–1100° C., therefore, avoids temperatures which, due to radical changes in the ductility and expansion of the base metal, result in stresses, deformation and warping of the base metal in the weldzone and heat-affected zone. In fusion welding of steel, these elevated temperatures and their consquent detrimental effects cannot be avoided.

The broad working temperature range which is incident to the weldbrazing process obviates the necessity for maintaining extremely close temperature control of the weldzone and thus permits even relatively unskilled welding operators to produce satisfactory and unspoiled welds.

Thus it will be apparent that the process of my invention lowers the bonding temperature as compared to that of fusion welding and utilizes steel filler metals instead of non-ferrous brazing metals, thereby combining the advantages of fusion welding and of brazing to prevent the deterioration of the base metal.

Having thus described my invention, I claim:

1. A method of effecting the non-fusion weld of a base metal with a steel weldmetal, wherein said base metal is selected from the group consisting of ferrous metals and brazable non-ferrous metals, comprising the steps of preheating said base metal to an elevated temperature below the solidus of said base metal, melting said weldmetal, depositing said weldmetal in the weldzone to produce a resultant bonding temperature of said base metal which is below the solidus of said base metal, substantially concurrently introducing into the weldzone molten low-melting eutectiferous phase-forming elements in sufficient quantity to create an intermediate alloy phase having affinity for the weldmetal and base metal and surface tension-reducing elements for increasing the fluidity of the weldmetal, and maintaining said base metal at said resultant bonding temperature to completion of the weld.

2. A method of bonding an alloy steel weldmetal to a base metal without fusion of the base metal, wherein said base metal is selected from the group consisting of ferrous metals and brazable non-ferrous metals, comprising the steps of preheating said base metal to an elevated temperature below the solidus of the base metal, depositing on said base metal a molten alloy steel weldlayer to elevate the temperature of said base metal to a bonding temperature which is below the solidus of said base metal, said weldlayer having a sufficient quantity of alloying phases diffusible in said base metal at said bonding temperature to create an intermediate phase having affinity for said weldlayer and having surface tension-reducing elements for increasing the fluidity of the weldmetal, and regulating the heat input to said base metal to maintain it at said bonding temperature to completion of the weld.

3. A method as defined in claim 2, in which said base metal has a recognized critical temperature, and said bonding temperature is less than said critical temperature.

4. A method as defined in claim 2, in which said bonding temperature is below the liquidus temperature of the weldmetal.

5. A method as defined in claim 2, in which said alloying phases are selected from the group consisting of silicon, phosphorus, manganese, copper, chromium, nickel, molybdenum and boron.

6. A method as defined in claim 2, in which said surface tension-reducing elements are selected from the group consisting of silicon, phosphorus, titanium, zirconium, columbium, calcium, lithium and tantalum.

7. A method of welding a steel wedlmetal to a base metal without fusion of the base metal, wherein said base metal is selected from the group consisting of ferrous metals and brazable non-ferrous metals, comprising the steps of heating the base metal to an elevated temperature below its solidus temperature, applying to said base metal a sufficient quantity of low melting alloying constituents having phases diffusible in said base metal at said elevated temperature to create an intermediate alloy phase having affinity for the weldmetal and containing surface tension-reducing elements to increase the fluidity of the weldmetal, whereby an intermediate weldlayer is formed on said base metal, depositing molten steel weldmetal in said weldzone to elevate the temperature of said base metal to a bonding temperature below its solidus temperature, and maintaining said base metal at said bonding temperature to completion of the weld.

8. A method of effecting the non-fusion weld of a base metal with a steel weldmetal, wherein said base metal is selected from the group consisting of ferrous metals and brazable non-ferrous metals, comprising the steps of preheating said base metal to an elevated temperature below the solidus of the base metal, depositing molten weldmetal in the weldzone to elevate the temperature of the base metal to a bonding temperature below the solidus of the base metal, substantially simultaneously introducing into the weldzone eutectiferous phase-forming elements selected from the group consisting of silicon, phosphorus, manganese, copper, chromium, nickel, boron and molybdenum, in sufficient quantity to create an intermediate alloy phase having affinity for the weldmetal and base metal and surface tension-reducing elements selected from the group consisting of silicon, phosphorus, titanium, zirconium, columbium, calcium, lithium and tantalum, and maintaining said base metal at said bonding temperature to completion of the weld.

9. A method as defined in claim 8, wherein said eutectiferous phase-forming elements comprise at least 10% by weight of the composition of the weldlayer.

10. A method as defined in claim 8, wherein said bonding temperature is at least 50 degrees C. below the solidus temperature of said base metal.

11. A method as defined in claim 8, wherein said bonding temperature is not lower than a temperature equivalent to 55% of said solidus temperature measured in degrees centigrade.

12. A method of effecting the non-fusion weld of a carbon steel base metal with a steel weldmetal, comprising the steps of pre-heating said steel base metal to a temperature between 750° C. and 960° C., melting said weldmetal, depositing said weldmetal in the weldzone to produce a resulant bonding temperature between 850° C. and 1160° C., substantially concurrently introducing into the weldzone molten low-melting eutectiferous phase-forming elements in sufficient quantity to create an intermediate alloy phase having affinity for the weldmetal and base metal and surface tension-reducing elements for increasing the fluidity of the weldmetal, and maintaining said base metal at said resultant bonding temperature to completion of the weld.

13. A method of effecting the non-fusion weld of a stainless steel base metal with a steel weldmetal, comprising the steps of preheating said base metal to a temperature of about 800° C., melting said weldmetal, depositing said weldmetal in the weldzone to produce a resultant bonding temperature of about 870° C., substantially concurrently introducing into the weldzone molten low-melting eutectiferous phase-forming elements in sufficient quantity to create an intermediate alloy phase having affinity for the weldmetal and base metal and surface tension-reducing elements for increasing the fluidity of the weldmetal, and maintaining said base metal at said resultant bonding temperature to completion of the weld.

14. A method of effecting the non-fusion weld of a manganese steel base metal with a steel weldmetal, comprising the steps of preheating said base metal to an elevated temperature below the solidus of said base metal, melting said weldmetal, depositing said weldmetal in the weldzone to produce a resultant bonding temperature of about 1150° C., substantially concurrently introducing into the weldzone molten low-melting eutectiferous phase-forming elements in sufficient quantity to create an intermediate alloy phase having affinity for the weldmetal and base metal and surface tension-reducing elements for increasing the fluidity of the weldmetal, and maintaining said base metal at said resultant bonding temperature to completion of the weld.

15. A method of effecting the non-fusion weld of a nickel-molybdenum alloy base metal with a steel weldmetal, comprising the steps of preheating said base metal to a temperature of about 1000° C., melting said weldmetal, depositing said weldmetal in the weldzone to produce a resultant bonding temperature of about 1100° C., substantially concurrently introducing into the weldzone molten low-melting eutectiferous phase-forming elements in sufficient quantity to create an intermediate alloy phase having affinity for the weldmetal and base metal and surface tension-reducing elements for increasing the fluidity of the weldmetal, and maintaining said base metal at said resultant bonding temperature to completion of the weld.

KARL SPITZ.

References Cited in the file of this patent

UNITED STATES PATENTS

| Number | Name | Date |
|---|---|---|
| 1,327,098 | Kellogg | Jan. 6, 1920 |
| 2,043,952 | Ffield | June 9, 1936 |
| 2,190,267 | Light | Feb. 13, 1940 |
| 2,249,723 | Orr | July 15, 1941 |
| 2,288,869 | Wassermann | July 7, 1942 |

OTHER REFERENCES

Eutectic Low Temp. Weld, copyrighted 1942 Pub. by Eutectic Weld. Alloys Co., New York, N. Y.

The Eutectic Welder, vol. 2, No. 1, August 1944 Pub. by Eutectic Weld. Alloys, New York, N. Y.